United States Patent [19]

Tanaka et al.

[11] Patent Number: 5,064,297
[45] Date of Patent: Nov. 12, 1991

[54] STATIC PRESSURE GAS BEARING WITH THROTTLING CONTROL VALVE IN HOUSING

[75] Inventors: Mamoru Tanaka, Yokohama; Masayuki Suzuki, Maebashi; Koichi Kawakami, Yokohama, all of Japan

[73] Assignee: Nippon Seiko Kabushiki Kaisha, Tokyo, Japan

[21] Appl. No.: 658,777

[22] Filed: Feb. 21, 1991

[30] Foreign Application Priority Data

Feb. 26, 1990 [JP] Japan .................................. 2-042690
Feb. 26, 1990 [JP] Japan .................................. 2-042691
Feb. 26, 1990 [JP] Japan .................................. 2-042692

[51] Int. Cl.[5] ............................................. F16C 32/06
[52] U.S. Cl. ...................................... 384/100; 384/111
[58] Field of Search ............... 384/100, 107, 111, 112, 384/114, 118, 121, 123

[56] References Cited

U.S. PATENT DOCUMENTS

| | | | |
|---|---|---|---|
| 2,578,713 | 12/1951 | Martellotti | 384/118 |
| 3,432,213 | 3/1969 | Adams | 384/100 X |
| 3,442,560 | 5/1969 | De Gast | 384/100 X |
| 3,749,456 | 7/1973 | Whitaker | 384/118 |
| 3,785,708 | 1/1974 | Miyasaki | 384/111 |

FOREIGN PATENT DOCUMENTS

| | | |
|---|---|---|
| 45-37683 | 11/1970 | Japan . |
| 50-149753 | 12/1975 | Japan . |
| 63-230219 | 9/1988 | Japan . |
| 797528 | 7/1958 | United Kingdom . |
| 1604050 | 12/1981 | United Kingdom . |

*Primary Examiner*—Thomas R. Hannon
*Attorney, Agent, or Firm*—Foley & Lardner

[57] ABSTRACT

A static pressure gas bearing is incorporated in a housing wherein a slotted groove with a small volume and a throttling control valve are positioned close together. Compressed gas is injected onto the bearing surface from the slotted groove. This configuration provides a static pressure gas bearing in which it is difficult to develop self-induced vibration.

3 Claims, 5 Drawing Sheets

STATIC PRESSURE GAS BEARING WITH THROTTLING CONTROL VALVE IN HOUSING

BACKGROUND OF THE INVENTION

1. Field of the Invention

The present invention relates to a static pressure gas bearing for use as a bearing for rotating parts in precision machinery and the like.

2. Description of the Prior Art

Conventionally, a static pressure gas bearing is widely used to support a rotating member such as a rotating bearing and the like which is incorporated into a precision machinery or the like and rotates at high speed, such that the rotating member is supported by the force of a compressed gas such as air.

This type of conventionally known static pressure gas bearing as depicted in FIG. 12 and FIG. 13 is disclosed in Japanese Patent Publication of Examined Application No. 45-37683.

In FIG. 12, a rotating shaft 3 is inserted to the inside of a bearing member 1 of which the inner peripheral surface forms a cylindrical bearing surface 2. Provided in the bearing surface 2 are a plurality of indented sections 4a, 4b, 5a, 5b which are formed at the four positions in the top, bottom, left and right respectively of the cylindrical bearing surface 2. The rotating shaft 3 is then supported in a non-contact state at the inside surface of the bearing member 1 by a compressed gas supplied to the indented sections 4a, 4b, 5a, 5b.

A compressed gas supply source such as a compressor (not shown) is communicated through a first throttling control valve 6 with the indented sections 4a, 4b, which are the upper and lower sections of the four indented sections 4a, 4b, 5a, 5b. This compressed gas supply source is also communicated with the left and right indented sections 5a, 5b through a second throttling control valve 7.

The volume and pressure of the compressed gas fed to the upper and lower indented sections 4a, 4b and to the left and right indented sections 5a, 5b are regulated, respectively, through the first and second throttling control valves 6, 7, so that the concentricity of the bearing surface 2 with the outer peripheral surface of the rotating shaft 3 is maintained. The first and second throttling control valves 6, 7 of this type have, for example, a configuration such as illustrated in FIG. 13.

The first throttling control valve 6 is here described for purposes of explanation, but this description may be applied equally well to the second throttling control valve 7. Therefore, the following description includes the second throttling control valve 7 and its members in parenthesis.

In FIG. 13, a first port 9 provided at the center of one surface of a housing 8 which forms the first throttling control valve 6 (the second throttling control valve 7) is communicated with the indented section 4a (5a) by a first supply tube 10. Also, a second port 11, provided at the center of the other surface of the housing 8 is communicated with the indented section 4b (5b) by a second supply tube 12. In addition, a diaphragm 15 is provided in the middle section of the housing 8. The diaphragm 15 divides the inside of the housing 8 into a first chamber 13 on the side of the first port 9 and a second chamber 14 on the side of the second port 11. A compressed gas is fed from the compressed gas supply source (not shown) into the first and second chambers 13, 14 as shown by an arrow.

At one part of the inner surface of the housing 8, the sections surrounding the openings of the first and second ports 9, 11 project inward or toward the diaphragm 15, each extending over the entire periphery of the opening. As a result, a first throttling passage 16 is formed on one side of the diaphragm 15 in the section between the first port 9 and the first annular chamber 13, and a second throttling passage 17 is formed on the other side of the diaphragm 15 between the second port 11 and the second annular chamber 14.

In the case where the outer peripheral surface of the rotating shaft 3 and the bearing surface 2 are not concentric, caused by the displacement of the rotating shaft 3, the volume and pressure of compressed gas entering the indented sections 4a, 4b and 5a, 5b are suitably regulated by the action of the first and second throttling control valves 6, 7, so that the outer peripheral surface of the rotating shaft 3 and the bearing surface 2 become concentric.

For example, when the rotating shaft 3 is displaced downward in FIG. 13, the clearance dimension of a bearing gap 18 between the outer peripheral surface of the rotating shaft 3 and the bearing surface 2 is reduced in the lower portion closer to the indented section 4a (5a) and increased in the upper portion closer to the indented section 4b (5b). As a result of this dimensional change, the pressure is increased within the lower indented section 4b (5b) and decreased within the upper indented section 4a (5a). Therefore, the pressure within the second port 11 communicated with the lower indented section 4b (5b) through the second supply tube 12 increases, and the pressure within the first port 9 communicated with indented section 4a (5a) through the first supply tube 10 decreases.

As a result, the diaphragm 15 which separates the first and second ports 9, 11 is displaced upward, so that the second throttling passage 17 widens and the first throttling passage 16 narrows. This causes the volume and pressure of the compressed gas entering the lower indented section 4b (5b) to increase, and the volume and pressure of the compressed gas entering the upper indented section 4a (5a) to decrease. The rotating shaft 3 is then pressed in the upward direction in FIG. 13, so that the displacement of the rotating shaft 3 is corrected.

However, the following drawbacks are inherent in a conventional static pressure gas bearing with this type of structure and action.

Specifically, with this conventional structure, the indented sections 4a, 4b, 5a and 5b for supplying compressed gas to the bearing gap 18 are comprised of relatively large depressions. Because of this, self-induced vibration is readily produced by compressed gas entering the indented sections 4a, 4b, 5a and 5b. When this self-induced vibration occurs, the operation of the precision machinery and the like in which the static pressure gas bearing is incorporated becomes unstable.

In particular, as shown in FIG. 12 and FIG. 13, when the first and second supply tubes 10, 12 for communication between the first and second throttling control valves 6, 7 and the indented sections 4a, 4b, 5a and 5b are long, the flow control response is poor and the abovementioned self-induced vibration is readily produced.

SUMMARY OF THE INVENTION

An object of the present invention is to provide, with due consideration to the drawbacks of such conventional static pressure gas bearings, a static pressure gas bearing wherein self-induced vibration is not produced by compressed gas supplied to the bearing.

This object is achieved in the present invention by the provision of a static pressure gas bearing comprising a housing having a bearing surface and a feed gas flow channel, a rotating member which opposes the bearing surface on the housing through a bearing gap therebetween, a slotted groove formed in the bearing surface and communicated with a source of supply of a compressed gas via the feed gas flow channel, and a throttling control valve having a plate spring and incorporated in the housing, such that the throttling control valve is provided between the slotted groove and the gas supply source, wherein the throttling control valve controls the volume of the compressed gas supply to the slotted groove, based on the elastic displacement of the plate spring.

Because of this structure, self-induced vibration produced by the compressed gas introduced to support the rotating member, occurs only with difficulty in the present invention. Therefore, precision machinery and the like in which the static pressure gas bearing of the present invention is incorporated can be operated in a stable manner with sufficiently high rigidity of the bearing.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
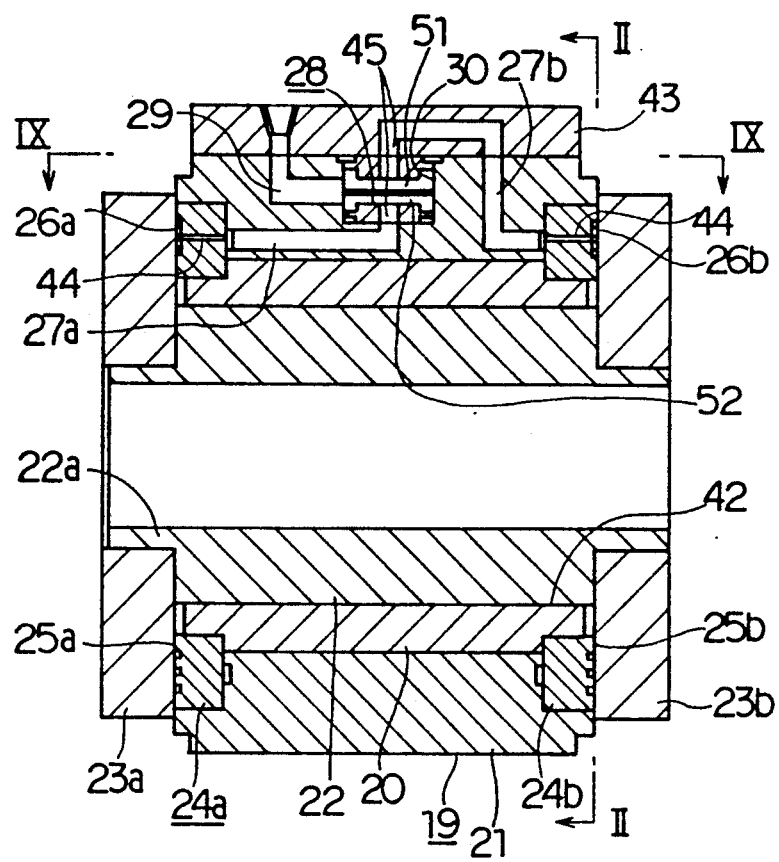
FIG. 1 is a cross-sectional view of a first embodiment of the present invention.
Figure 2:
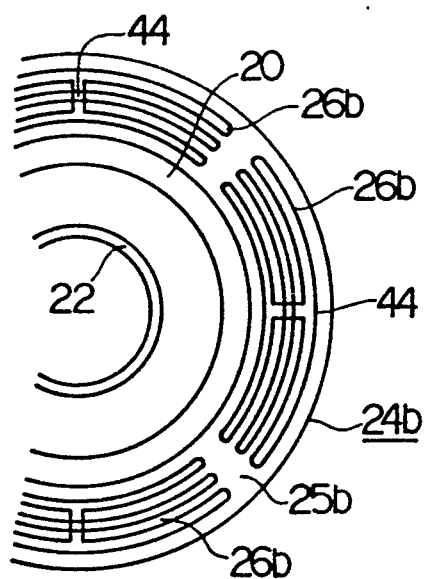
FIG. 2 is a partly cut-away, view taken along the line II—II of FIG. 1 showing the structure of a slotted groove formed in the bearing surface.
Figure 3:
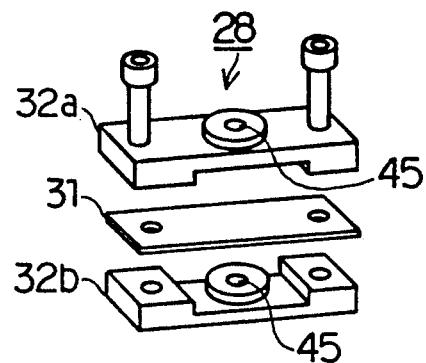
FIG. 3 is an exploded perspective view of a throttling control valve.

Now referring to FIGS. 1 and 3 which show a first embodiment of the present invention, in FIG. 1, a housing 19 is comprised of an inner tube 20, an outer tube 21 and a pair of bearing members 24a, 24b. The outer tube 21 formed in a short cylindrical shape is securely fitted over the inner tube 20 also formed in a short cylindrical shape.

A rotating member 22 is comprised of a cylindrical member 22a and a pair of flange plates 23a, 23b. The cylindrical member 22a having an outer diameter of about 50 to 150 mm is inserted through the inside of the inner tube 20. The pair of flange plates 23a, 23b are secured to the respective ends of the cylindrical member 22a.

A pair of bearing members 24a, 24b are secured to the inner tube 20 and the outer tube 21 at the end surface thereof, respectively, and have a bearing surface 25a and a bearing surface 25b, respectively.

The axially inside surfaces of the flange plates 23a, 23b oppose the bearing surface 25a and the bearing surface 25b of the pair of bearing member 24a, 24b.

The bearing members 24a, 24b are interposed between the inner tube 20 and the outer tube 21 and are secured to the end surfaces of the inner tube 20 and the outer tube 21. The axially outer surfaces of the bearing members 24a, 24b provide the bearing surfaces 25a and 25b. At least the bearing surfaces 25a and 25b are formed from an aluminum or copper type soft alloy which contain either carbon fiber or graphite or both.

A pair of slotted grooves 26a, 26b is provided between the flange plate 23a and the bearing member 24a and between the flange plate 23b and the bearing member 24b, respectively, such that the slotted groove 26a is formed in the bearing surface 25a and the slotted groove 26b is formed in the bearing surface 25b. The slotted grooves 26a, 26b are formed from a plurality of concentric arc sections and a plurality of continuous radiating sections which connect the concentric arc sections to each other.

The slotted grooves 26a, 26b are respectively communicated with a compressed gas supply source such as a compressor (not shown) through a pair of through-holes 44 with an inner diameter of about 1 to 3 mm, a pair of distribution channels 27a, 27b with an inner diameter of about 2 to 4 mm, a throttling control valve 28 provided in the outer tube 21, and a feed channel 29. Therefore, the rotating member 22 is supported in a non-contacting state in the housing 19 by the supply of compressed gas in the slotted grooves 26a, 26b.

Specifically, the compressed gas fed into the slotted grooves 26a, 26b is contained in the bearing gap between the bearing surfaces 25a and 25b and the inside surfaces of the flange plates 23a, 23b, so that the rotating member 22 and the housing 19 freely rotate without coming into contact with one another.

The throttling control valve 28 is provided between the feed channel 29 and the distribution channels 27a, 27b, which are communicated with the slotted grooves 26a, 26b. The throttling control valve 28 has the same function as the first and second throttling control valves 6, 7 in the conventional static pressure gas bearing shown in FIGS. 12, 13. Specifically, the throttling control valve 28 regulates the feed volume and pressure of the compressed gas supplied to the slotted grooves 26a, 26b. The throttling control valve 28 therefore acts to prevent a big difference from being produced between the magnitude of the bearing gap between the inner surface of the flange plate 23a and the bearing surface 25a and the magnitude of the bearing gap between the inner surface of the flange plate 23b and the bearing surface 25b.

The throttling control valve 28 is provided inside an indented section 30 formed in the outer peripheral surface of the outer tube 21 which forms the housing 19. Specifically, the throttling control valve 28 housed in the indented section 30 comprises a diaphragm 31 fabricated from a metal plate spring and a pair of valve seat plates 32a, 32b between which the diaphragm 31 is interposed as shown in FIG. 3. The open section of the indented section 30 is covered by a cover plate 43.

The distribution channel 27b which is communicated with the slotted groove 26 is partly formed in the cover plate 43.

As a result, the pair of distribution channels 27a, 27b is connected to the throttling control valve 28 from the respective side thereof.

Because the basic structure and action of the throttling control valve 28 are the same as the first and second throttling control valves 6, 7 (FIGS. 12, 13), a detailed description is omitted.

Figure 9:
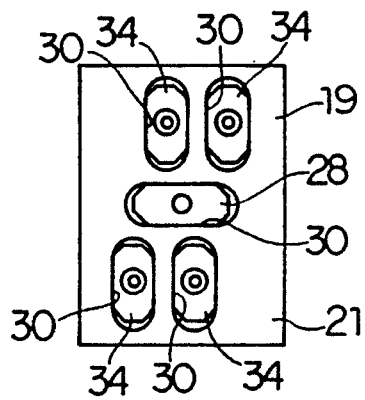
FIG. 9 is a view taken along the line IX—IX of FIG. 1.

The plate spring which forms the diaphragm 31 of the throttling control valve 28 is rectangular and preferably has a thickness of about 0.1 to 0.35 mm. By forming the plate spring in the form of a rectangle, space is saved when a plurality of throttling control valves are installed as shown in FIG. 9.

In the case where the thickness of the plate spring is less than 0.1 mm, the diaphragm excessively overreacts to a change in pressure, so that the control by the throttling control valve 28 is unstable, and self-induced vibration is readily produced. Conversely, if the thickness exceeds 0.35 mm, the action of the diaphragm becomes sluggish and control by the throttling control valve 28 deteriorates.

The inner diameter of a through-hole 45 formed in the center section of the valve seat plate 32a, 32b is preferably about 1 to 3 mm. When the inner diameter of a through-hole 45 is less than 1 mm, the volume of compressed gas supplied to the slotted grooves 26a, 26b is insufficient, so that the rotating member 22 is inadequately supported. Conversely, when the inner diameter of a through-hole 45 exceeds 3 mm, the width in the radial direction of a first throttling flow channel 51 and a second throttling flow channel 52 is small, so that the throttling effect is small, causing the amount of turbulent flow of the compressed gas to increase and the support of the rotating member 22 to be unstable.

In this embodiment of the static pressure gas bearing of the present invention, the compressed gas for supporting the rotating member 22 passes through the slotted grooves 26a, 26b and is fed into the bearing gap between the inside surfaces of the flange plates 23a, 23b and the bearing surfaces 25a, 25b, so that the rotating member 22 is supported in a state of non-contact. In the case where the rotating member 22 shifts in the axial direction (the lateral direction in FIG. 1), this shift is corrected by the throttling control valve 28.

The characteristics of the static pressure gas bearing of the present invention are improved in the comparatively high frequency region from the action of the slotted grooves 26a, 26b, and the characteristics are improved in the comparatively low frequency region from the action of the throttling control valve 28. Therefore, it is possible to obtain adequate characteristics over almost all frequencies.

The present invention will now be explained with reference to actual tests performed relative to the combination of the slotted groove and the throttling control valve.

Figure 4:
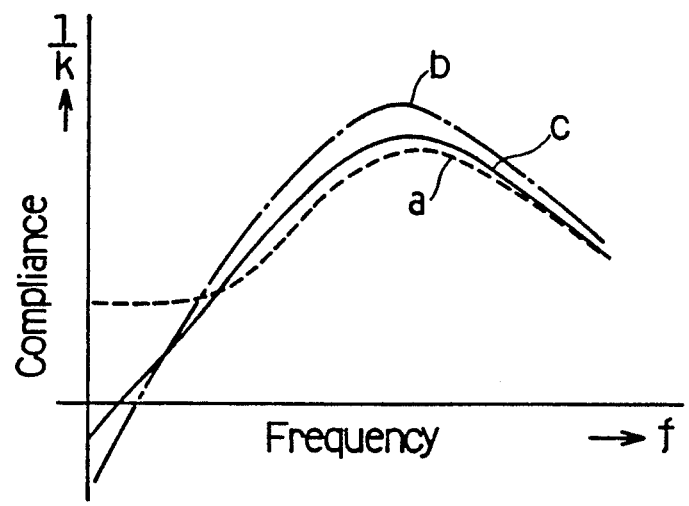
FIG. 4 is a diagram illustrating the difference between the characteristics of a conventional static pressure gas bearing and the static pressure gas bearing of the present invention.

In the case where the slotted grooves were formed in the bearing surface but the throttling control valve was not provided, the relationship between the compliance, which is the inverse of the bearing rigidity (=load volume/displacement), and the vibration frequency is shown by the broken line a in FIG. 4.

Figure 12:
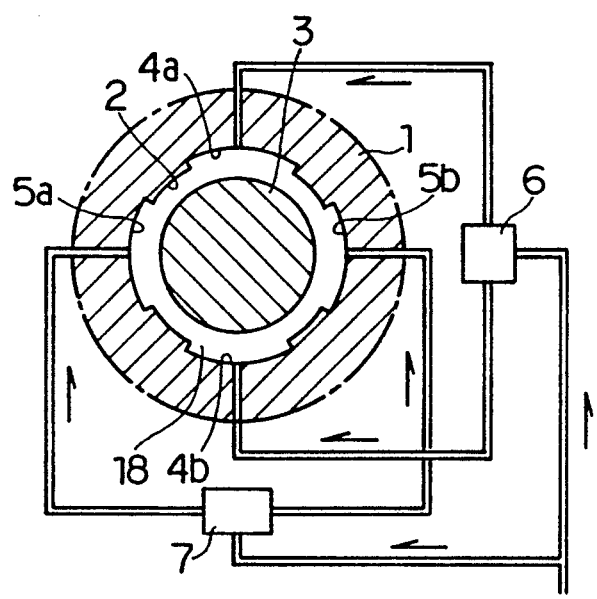
FIG. 12 is a cross sectional view illustrating one example of a conventional static pressure gas bearing.
Figure 13:
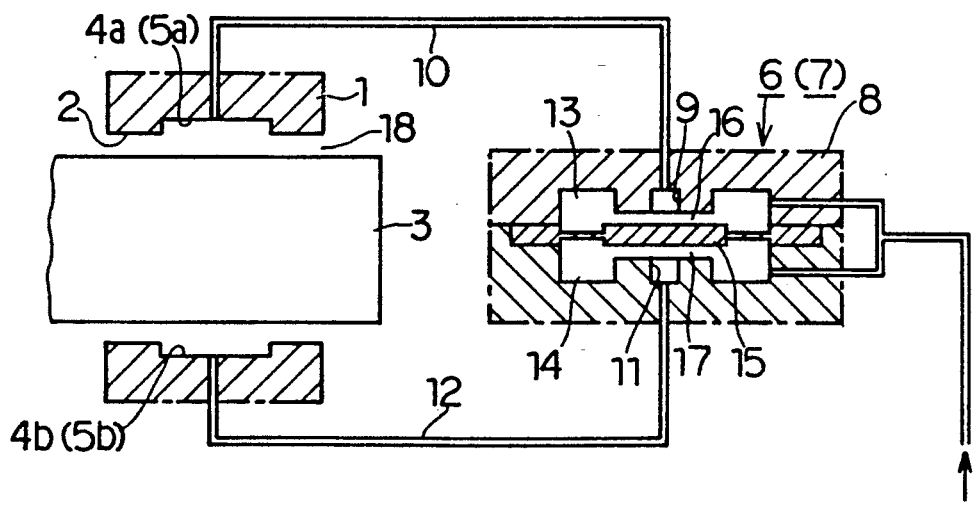
FIG. 13 is a partly cut-away, cross-sectional view illustrating a control circuit for a throttling control valve of the static pressure gas bearing of FIG. 12.

As shown in FIGS. 12, 13, when the throttling control valve is provided but a simple indented section is formed in the bearing surface, the relationship between the compliance and the vibration frequency takes the form of the chain line b in the drawing.

In addition, as shown in FIG. 1, in the case where the slotted groove is formed in the bearing surface and the throttling control valve is provided, the relationship between the compliance and the vibration frequency takes the form of the solid line c in the drawing.

As clearly shown by FIG. 4, adequate characteristics are obtained with the static pressure gas bearing of the present invention over almost all the area of freqencies.

In addition, in the static pressure gas bearing of the present invention, the throttling control valve 28 is accommodated in the housing 19, and the distribution channels 27a, 27b, which link the throttling control valve 28 and the slotted grooves 26a, 26b, respectively, are short, so that it is not only possible to make the static pressure gas bearing itself small, but in the case where the rotating member 22 is displaced, the response characteristics of the throttling control valve 28 are improved.

Further, because the bearing surfaces 25a, 25b of the static pressure gas bearing of the present invention are fabricated from a soft alloy, the slotted grooves 26a, 26b are easily formed. Even in the case where a foreign material such as dirt enters the bearing gap, because the friction factor of the bearing surface is small, the occurrence of non-repairable breakdowns such as seizure and the like is greatly reduced.

Because large numbers of slotted grooves 26a, 26b are formed in the bearing surfaces 25a, 25b of the static pressure gas bearing of the present invention, and the compressed gas is fed through these many slotted grooves 26a, 26b to the bearing gap, the pressure distribution is comparatively uniform over the entire bearing gap, so that an adequate load volume is ensured, and an adequate damping area is ensured, whereby self-induced vibration is produced only with difficulty.

Figure 7:
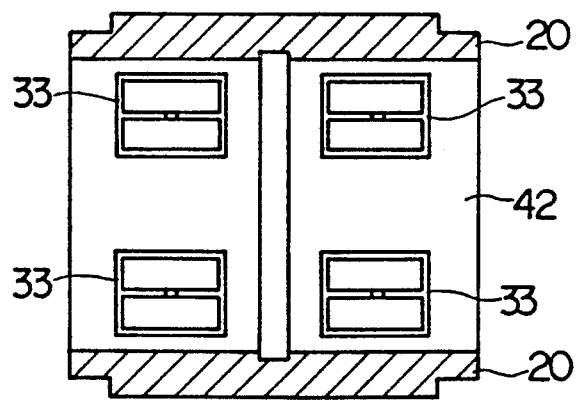
FIG. 7 is a view taken along the line VII—VII of FIG. 6 with the rotating member removed to show the structure of a slotted groove formed in the bearing surface.
Figure 5:
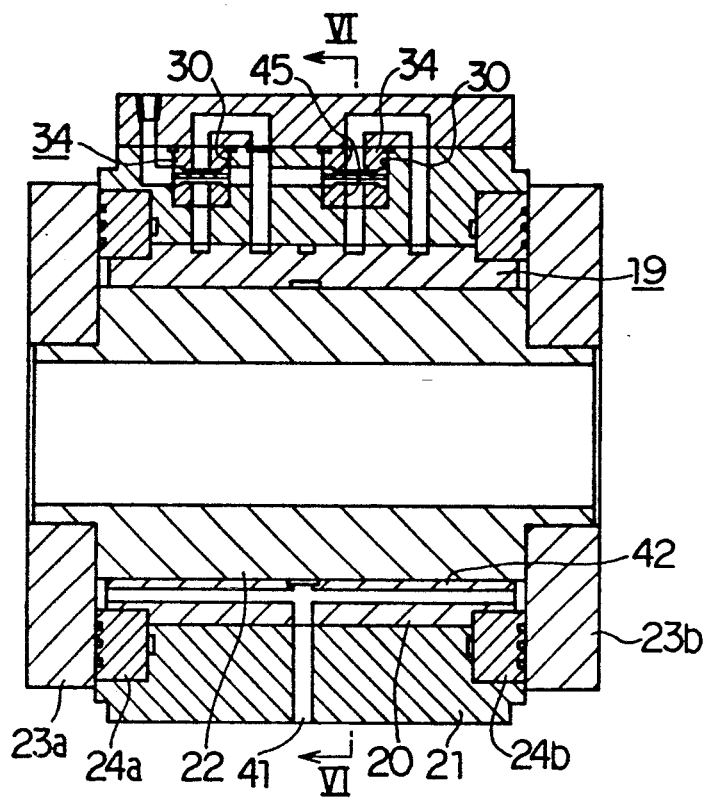
FIG. 5 is cross-sectional view of a second embodiment of the present invention.
Figure 6:
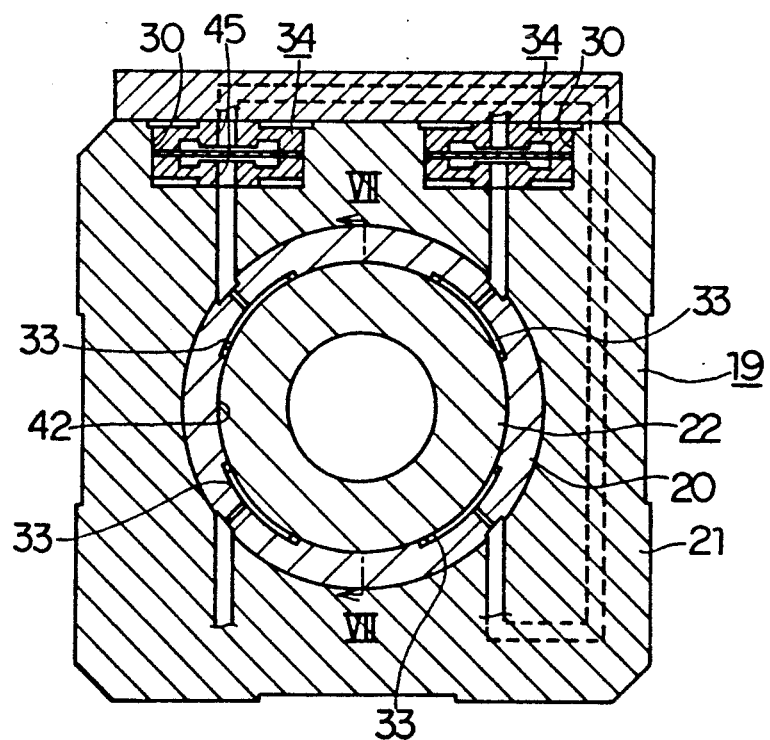
FIG. 6 is a cross-sectional view taken along the line VI—VI of FIG. 5.

FIG. 5 to FIG. 7 illustrate a second embodiment of the static pressure gas bearing of the present invention.

The inner tube 20 which forms the housing 19 is fabricated from a soft alloy such as an aluminum or copper type alloy which contains either carbon fiber or graphite or both. The rotating member 22 is fabricated from steel for improved strength and endurance.

The inner peripheral surface of the inner tube 20 forms a bearing surface 42. Four slotted grooves 33 of the shape illustrated in FIG. 7 are formed in the bearing surface 42 at two positions in the axial direction.

As shown in FIG. 5, FIG. 6, and FIG. 9, a pair of throttling control valves 34 is accommodated in a pair of indented sections 30, respectively, formed in the outer peripheral surface of the outer tube 21. The compressed gas passes through each of the throttling control valves 34 and is supplied to each of the slotted grooves 33.

The operation to form this type of slotted groove 33 on the bearing surface 42 of the inner peripheral surface of the inner tube 20 can be achieved in any conventionally known processing method. For example, when the bearing surface 42 is formed from a soft alloy, the slotted grooves 33 can be formed by utilizing a component rolling process method such as the method disclosed in Japanese Laid Open Patent Application No. 63-230219.

Figure 8:
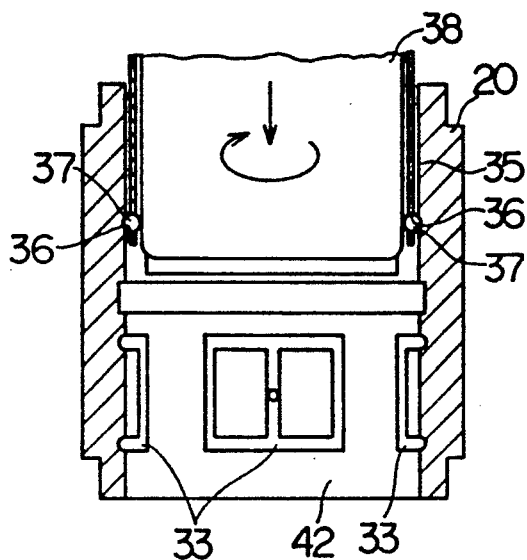
FIG. 8 is a partly cut-away, cross-sectional view illustrating a pressure rod and a ball holder inserted into the inner tube of a bearing for forming a slotted groove.

Specifically, the component rolling process method is implemented in the manner shown in FIG. 8. A pair of steel balls 37 is provided sot hat these steel balls 37 are each supported in a freely rolling manner in one of a pair of supporting holes 36 of a cylindrical holder 35. The outer peripheral surface of a pressure rod 38 comes into contact with the steel balls 37, and the pressure rod 38 is rotated while the steel balls 37 are pressed against the bearing surface 42, or is displaced in the axial direction. As a result, the slotted grooves 33 are formed in the bearing surface 42 conforming to the impression of the pressed steel balls 37.

In addition, a waste gas channel 41 is provided in a part of the housing 19 at a position separated from the throttling control valves 34. The compressed gas injected from the slotted grooves 33 into the bearing gap is freely expelled from the system through the waste gas channel 41 to the outside.

An operation with good characteristics can also be obtained with the radial bearing of the second embodiment of the present invention from the coaction of the slotted groove 33 and the throttling control valve 34 in the same manner as with the thrust bearing of the first embodiment.

When the material used for the bearing surfaces 25a, 25b, 42 is a copper alloy containing carbon fiber and lead, tin, or the like, the advantage is obtained that these softer materials are easier to process than steel.

In the case where the copper alloy contains carbon fiber in order to improve the sliding and wear resistance characteristics, the amount of carbon fiber contained is in the range of 1 to 10 wt %, for, if the carbon fiber content is less than 1 wt % or greater than 10 wt %, the sliding characteristics deteriorate.

Accordingly, if the sliding characteristics are not of prime importance, the amount of carbon fiber used may be less than 1 wt % or greater than 10 wt %.

The material used for the bearing surfaces 25a, 25b, 42 may also be a copper alloy containing graphite instead of carbon fiber. Graphite is added in the range of 1 to 10 wt % to improve the sliding and wear-resistance characteristics. If the graphite content is less than 1 wt %, the sliding characteristics deteriorate and if the graphite content is greater than 10 wt %, the strength of the material decreases. However, if the sliding characteristics are not of prime importance, the amount of graphite used may be less than 1 wt %, and if strength is not too important, the amount of graphite used may be greater than 10 wt %.

Graphite tends to separate from metal with greater ease than carbon fiber. A copper alloy containing carbon fiber, therefore, is stronger than a copper alloy containing graphite.

In addition, if an aluminum alloy is used as the material for the bearing surfaces 25a, 25b, 42, the advantage is obtained that, because this material is softer than steel, it is easier to process.

An aluminum alloy containing carbon fiber in order to improve the sliding and wear-resistance characteristics and to reduce the weight can be, for example, a composition of 9 to 16 wt % Si, 1 to 4 wt % Cu, 1 to 3 wt % Mg, 1 to 5 wt % Fe, and 1 to 10 wt % carbon fiber with the balance being aluminum.

If the carbon fiber content is less than 1 wt % or, conversely, greater than 10 wt %, the sliding characteristics deteriorate. However, if the sliding characteristics are not of prime importance, the amount of carbon fiber used may be less than 1 wt % or greater than 10 wt %.

The material used for the bearing surfaces 25a, 25b, 42 may also be an aluminum alloy containing graphite instead of carbon fiber. An aluminum alloy containing graphite to improve the sliding and wear resistance characteristics and to reduce the weight can be, for example, a composition of 9 to 16 wt % Si, 1 to 4 wt % Cu, 1 to 3 wt % Mg, 1 to 5 wt % Fe, and 1 to 10 wt % graphite, with the balance being aluminum.

If the graphite content is less than 1 wt %, the sliding characteristics deteriorate. Conversely, if the graphite content is greater than 10 wt %, the strength of the material decreases. However, if the sliding characteristics are not of prime importance, the amount of graphite used may be less than 1 wt %. If strength is not too important, the amount of graphite used may be greater than 10 wt %.

Graphite tends to separate from metal with greater ease than carbon fiber. An aluminum alloy containing carbon fiber, therefore, is stronger than an aluminum alloy containing graphite.

The cross section of the slotted grooves 25a, 26b, 33 may be in the shape of an arc or may be rectangular.

Figure 10:
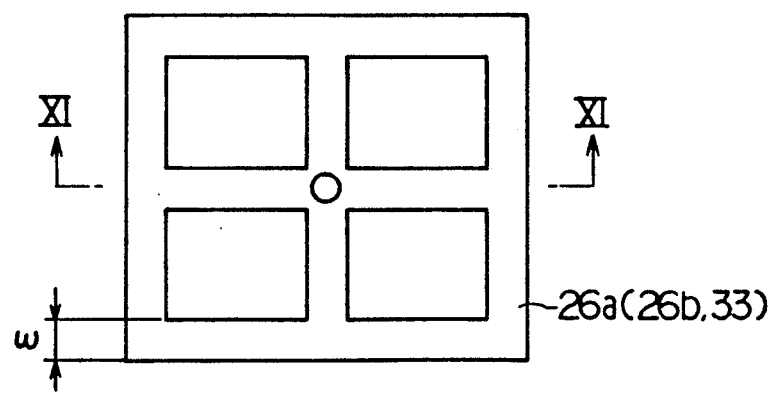
FIG. 10 is an enlarged view of another slotted groove.
Figure 11:
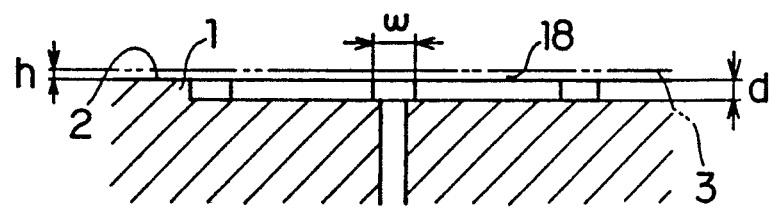
FIG. 11 is a partial cross sectional view taken along the line XI—XI of FIG. 10.

As shown in FIG. 10 and FIG. 11, the depth d of the slotted grooves 26a, 26b, 33 is preferably three to eight times the dimension h, which is normally 5 to 20 $\mu$m, of the bearing gap 18 [d=3h to 8h]. The width w of these slotted grooves is preferably one to five times the depth d [w=1d to 5d].

When the dimensions of the slotted grooves 26a, 26b, 33 are set in this manner, self-induced vibration is more difficult to produce. It is therefore possible to operate precision machining equipment incorporating a static pressure gas bearing under stable conditions. In addition, it is possible to increase the gas pressure and increase the bearing rigidity. When the dimensions are set in this range, an adequate bearing rigidity can be obtained at the practical amount of gas consumed in practice (for example, 5 to 50 l/min per bearing).

The reasons for setting the dimensions of the slotted grooves 26a, 26b, 33 are as follows.

First, the reason that the depth d of the slotted grooves 26a, 26b, 33 is set at three to eight times the dimension h, that is [d=3h to 8h] is because, in the case where the depth d is smaller than three times the gap dimension h, that is [d<3h], it is difficult to distribute the compressed gas generally throughout the slotted grooves 26a, 26b, 33 and to provide the slotted grooves 26a, 26b, 33 with the pressure of the compressed gas at a uniform level, so that the bearing rigidity is lowered. Conversely, in the case where the depth d is greater than eight times the gap dimension h, that is [d>8h], the volume of the slotted grooves 26a, 26b, 33 increases to the point where self-induced vibration is easily produced.

The following is the reason that the width w of the slotted grooves 26a, 26b, 33 is set at one to five times the depth d, that is [w=1d to 5d].

In the case where the width w is smaller than the depth d, that is [w<d], the slotted grooves 26a, 26b, 33 are difficult to machine, so that the manufacturing costs for the static pressure gas bearing are high with providing no merit. In addition, because it is difficult to distribute the pressure of the gas in the slotted grooves 26a, 26b, 33 uniformly, the bearing rigidity is lowered.

Conversely, in the case where the width w is greater than five times the depth d, that is [w>5d], the volume of the slotted grooves formed in the bearing surface 2 increases to the point where self-induced vibration is easily produced.

In some applications of the invention, however, the depth d and width w of the slotted grooves 26a, 26b, 33 may also be outside the abovementioned range.

At least three throttling control valves are required when throttling control valves are used to regulate the displacement in both the radial direction and the thrust direction for a static pressure gas bearing provided with both a radial bearing and a thrust bearing.

Also, five throttling control valves are required in the case where two radial bearings are provided in the axial direction to restrain the inclination of the rotating shaft 3.

In addition, four throttling control valves for use with thrust bearings are required to restrain the inclination of the rotating shaft 3 with the one pair of thrust bearings shown in the drawings.

What is claimed is:

1. A static pressure gas bearing comprising:
    a housing having a bearing surface and a feed gas flow channel;
    a rotating member which opposes said bearing surface on said housing through a bearing gap therebetween;
    a slotted groove formed in said surface of said bearing and communicated with a source of supply of a compressed gas via said feed gas flow channel incorporated in said housing;
    and a throttling control valve having a plate spring and provided between said slotted groove and said gas supply source when incorporated in said housing;
    wherein said throttling control valve controls the volume of said compressed gas supplied to said slotted groove, based on the elastic displacement of said plate spring.

2. The static pressure gas bearing of claim 1, wherein the depth of said slotted groove is three to eight times the dimension of said bearing gap, and the width of said slotted groove is one to five times said depth of said slotted groove.

3. The static pressure gas bearing of claim 1, wherein said bearing surface is formed from a soft alloy selected from the group of aluminum alloys and copper alloys containing at least one of carbon fiber and graphite.

* * * * *